May 25, 1954
E. A. BRUCKMAN
2,679,176
METHOD AND APPARATUS FOR MANUFACTURING
ARTICLES SUCH AS BUTTONS
Filed Nov. 15, 1949
4 Sheets-Sheet 1
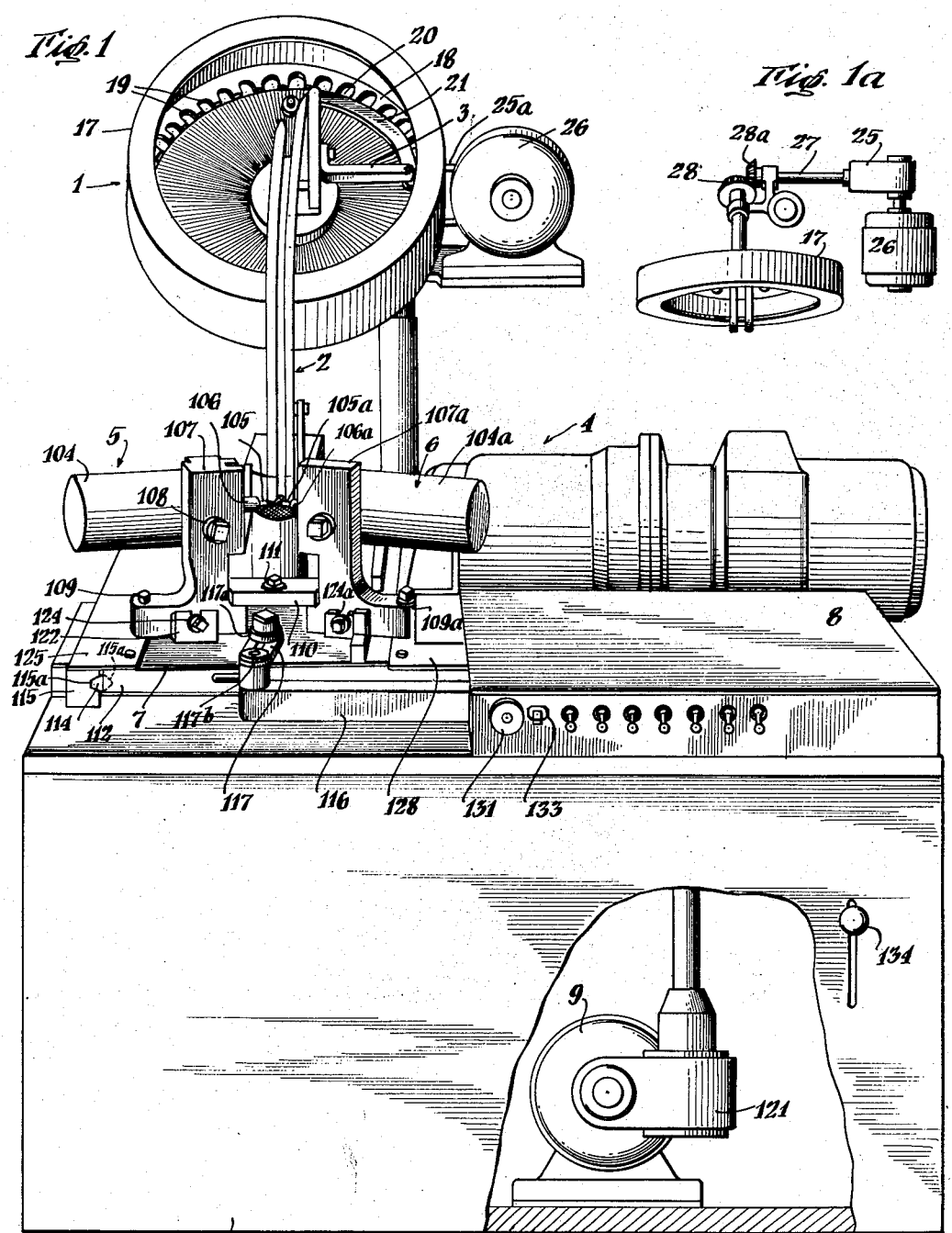
INVENTOR.
Eric A. Bruckman
BY
Norman N. Holland
ATTORNEY

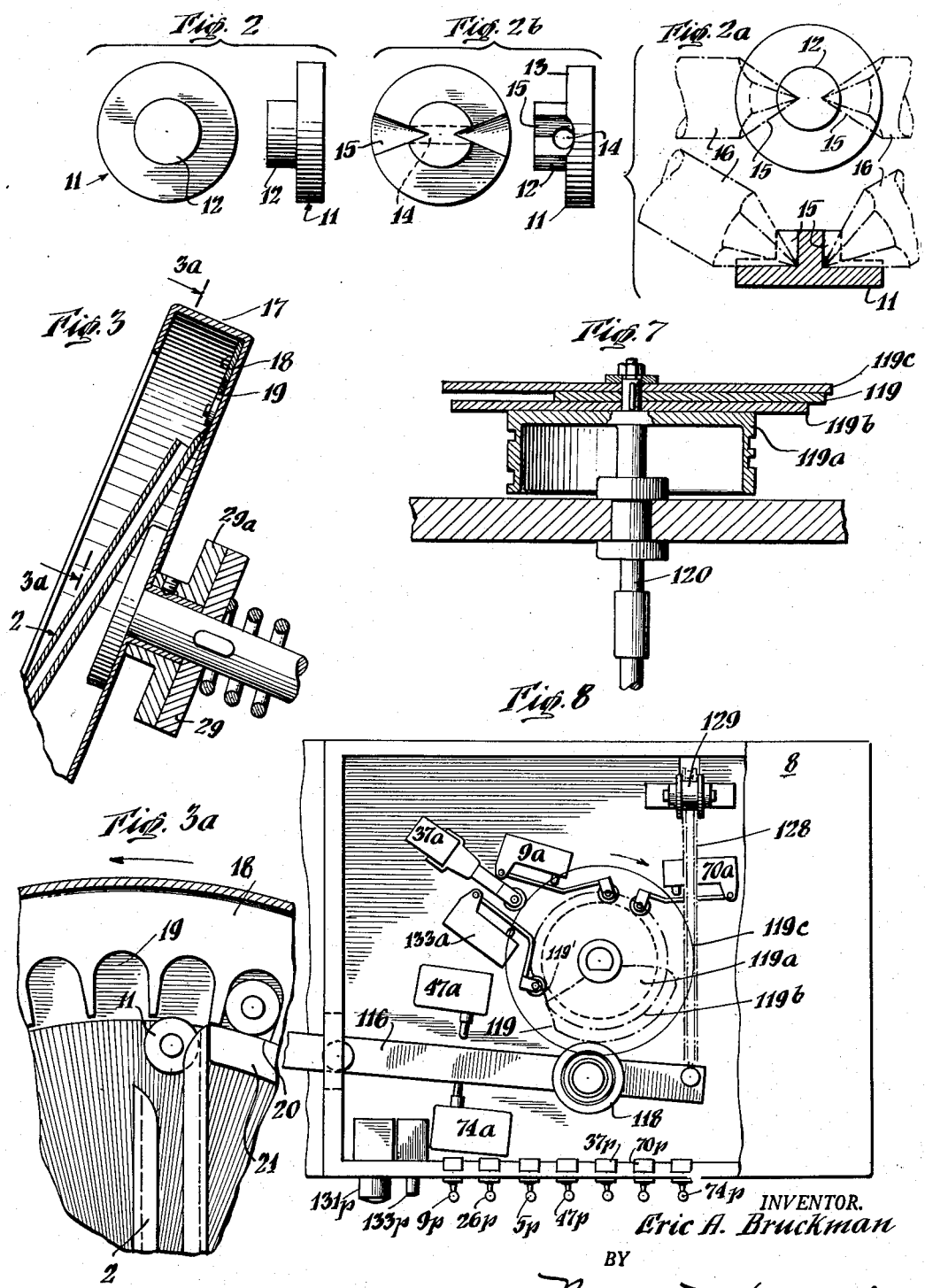

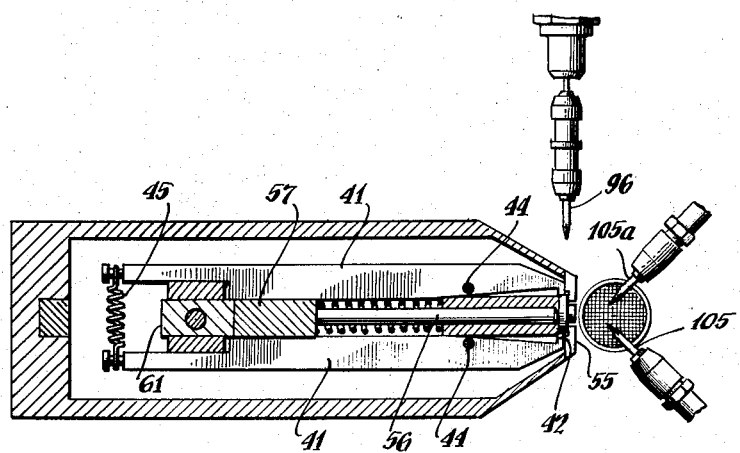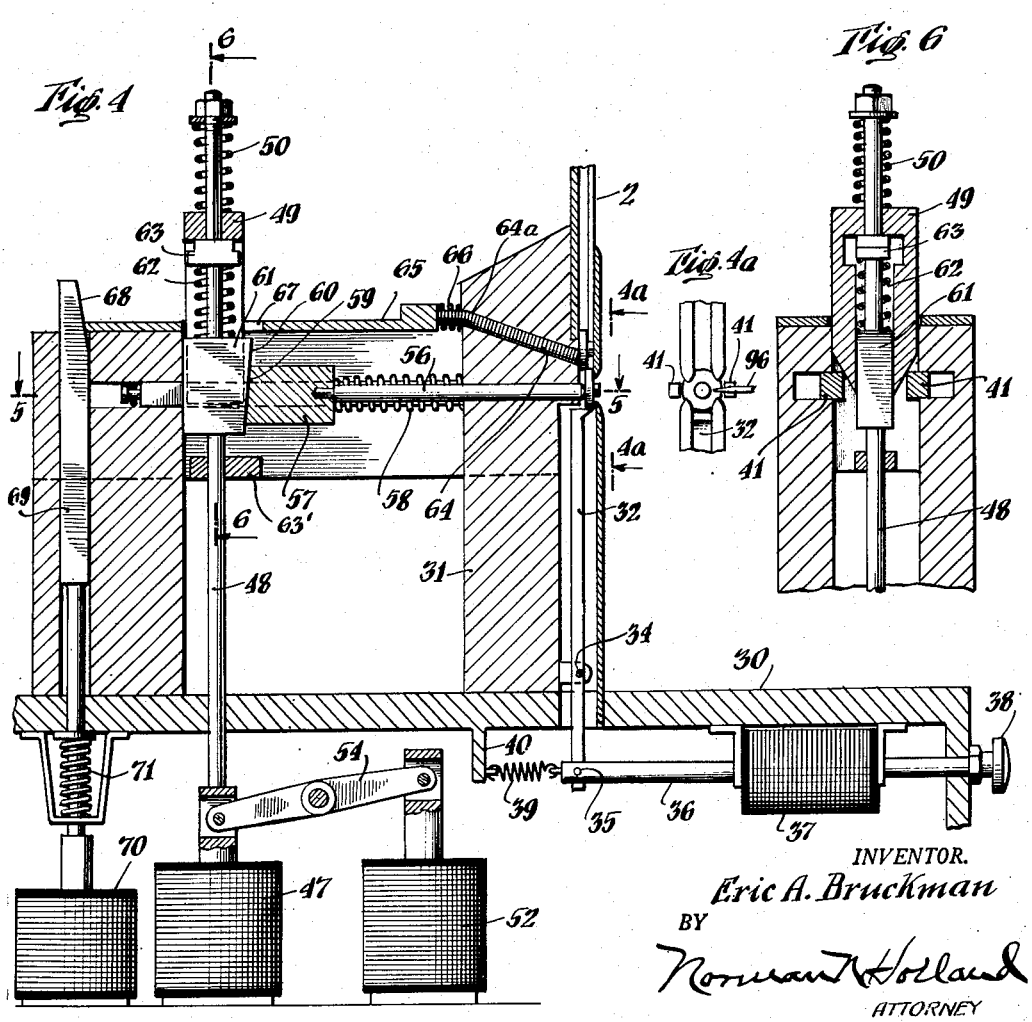

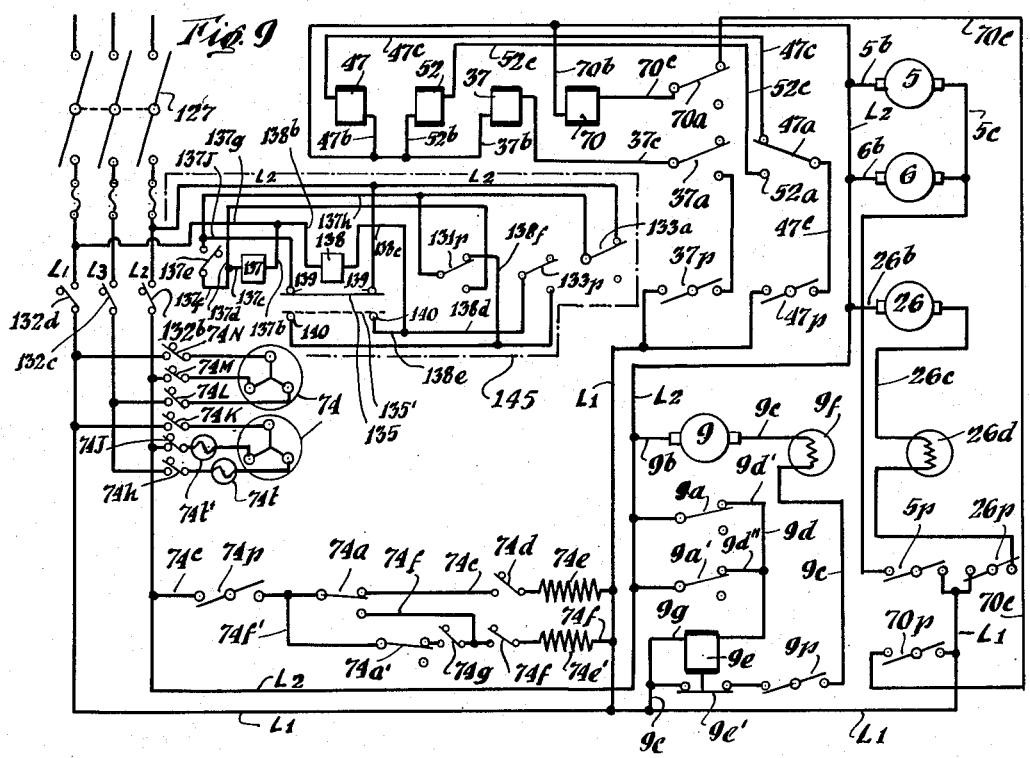
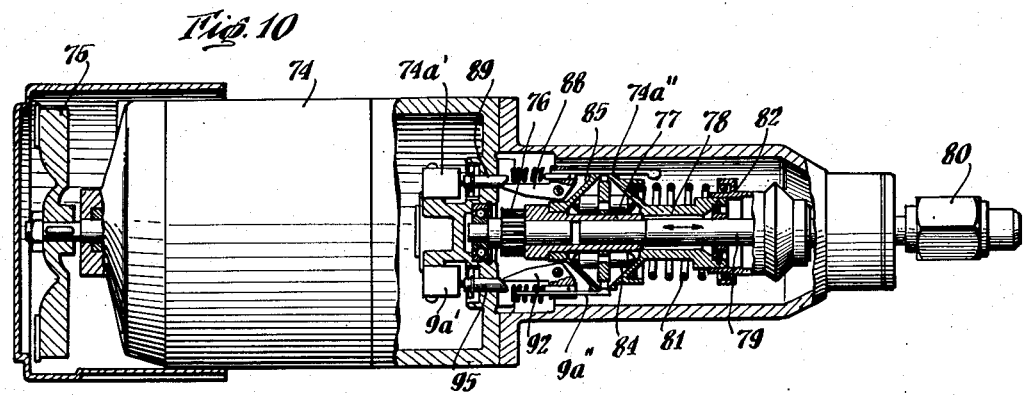
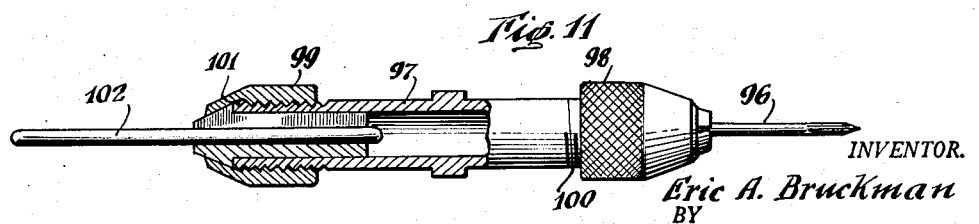
INVENTOR.
Eric A. Bruckman
BY
ATTORNEY

Patented May 25, 1954

2,679,176

UNITED STATES PATENT OFFICE 2,679,176

METHOD AND APPARATUS FOR MANUFACTURING ARTICLES SUCH AS BUTTONS

Eric A. Bruckman, Federalsburg, Md., assignor to Excelsior Pearl Works, Inc., Federalsburg, Md., a corporation of New York Application November 15, 1949, Serial No. 127,332

16 Claims. (Cl. 79—6)

The present invention relates to the manufacture of articles such as buttons and more particularly to the frazing and drilling of the shanks of buttons.

Pearl buttons and similar articles are manufactured from sea shells of various sizes and types. A blank the size of the button desired is cut from the shell, which is usually several times the thickness of the button, and thereafter sectioned into a plurality of blanks or otherwise shaped for subsequent operations. Where buttons of the so-called shank type are to be formed, the shank portion has to be ground on the blank. It is customary to form a pair of side channels in the shoulder and shank of the blank to provide suitable grooves for holding the thread in place when the button is sewed to a fabric. The forming of the grooves is usually referred to as frazing. Following this, an aperture is drilled laterally through the shank.

The operations in both the frazing and drilling are complicated due to variations in the hardness of the material because the character of the material varies with different shells and with different portions of the same shell. Thus hard spots may be encountered, which requires longer drilling and a longer cycle of operation. In addition, there are variations in the size of the blanks due to limitations in manufacture. In some blanks the shanks may be longer than others; likewise the thickness of the blanks may vary.

Heretofore the frazing and drilling operations have required an extended amount of labor by skilled operators. This has increased the cost of the finished article and in addition has occasioned defective buttons due to the human element involved.

The present invention aims to overcome the above objections by providing an automatic machine for the drilling and frazing operations which will minimize the labor required, eliminate the necessity for skilled operators, and minimize the defective buttons resulting in the manufacturing operations.

An object of the invention is to provide an improved method for forming side grooves in the shoulders and shanks of buttons.

Another object of the present invention is to provide an improved method and means for drilling apertures in buttons.

Another object of the invention is to provide an improved method and completely automatic machine, started by the depression of a single button and stopped in like manner, for frazing and drilling the shoulder and shanks of buttons.

Another object of the invention is to provide for automatic variations in the drilling period, which in some cases may exceed the drilling period alloted in the normal cycle of the machine, thereby to drill at a rapid rate blanks of soft material and at the same time successfully drill blanks of hard material.

Another object of the invention is to provide interlocking means to prevent simultaneous operation of the frazing and drilling devices and to avoid any interference of one with the other.

Another object of the invention is to provide improved safety devices in a machine of the type described.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view of a preferred embodiment of the machine, illustrating various parts thereof;

Fig. 1a is a top view of the hopper motor and the preferred mechanism through which it drives the hopper;

Fig. 2 is a top and side view of a button blank adapted to be formed into a button by the present method and machine;

Fig. 2a is a top plan and sectional side view illustrating the button blank of Fig. 2 before the frazing and after completion of the frazing respectively, with the frazing tools diagrammatically indicated in dot-dash lines;

Fig. 2b is a top plan and side view of a finished button, with an aperture drilled through the shank of the button;

Fig. 3 is a fragmentary sectional view through the hopper for feeding the blanks to the machine;

Fig. 3a is a fragmentary section along the line 3a—3a of Fig. 3;

Fig. 4 is a sectional view illustrating the mechanism for positioning and holding a blank for the frazing and drilling operations and also illustrating the means for selecting and releasing the blanks;

Fig. 4a is a fragmentary view along the line 4a—4a of Fig. 4;

Fig. 5 is a sectional view along the line 5—5 of Fig. 4 illustrating the blank positioning and holding means;

Fig. 6 is a sectional view along the line 6—6 of Fig. 4 illustrating the means for operating the blank positioning and holding means;

Fig. 7 is a sectional view through the cams which move the frazing devices in and out of position and which time various other operations by opening and closing suitable electric circuits;

Fig. 8 is a top plan view of the control box with the cover removed, illustrating the means for moving the frazing devices in and out of position and the cam for timing the other operations;

Fig. 9 is a wiring diagram illustrating the electrical connections in the preferred embodiment;

Fig. 10 is a side elevational view, partly in section, of a preferred embodiment of the motor and drive mechanism for the hole-forming drill; and Fig. 11 is a sectional view illustrating an attachment for interconnecting the drill with its driving means to absorb shocks and side motion.

General description

Referring again to the drawings illustrating a preferred embodiment of the invention and one way of practicing the method, there is shown in Fig. 1 a perspective view of the entire machine. Described generally the machine comprises a hopper 1 which feeds button blanks to a guideway 2 where the positioning means shown in Fig. 4 hold the bottom blank in position to be frazed and drilled. A pair of frazing devices 5 and 6, comprising motors and drills or milling tools, are mounted on a slidable base 7 for movement into and out of operating position. A drilling mechanism 4 comprising a motor and an associated drive mechanism is shown at one side of the machine for drilling an aperture through the shank of the button.

In the preferred embodiment, the frazing devices are first moved inwardly to mill a pair of side grooves leading to the buttonhole and thereafter a hole is drilled through the shank, a control box 8 is shown at the right of the machine comprising, as shown in Fig. 8, cams and a series of switches for timing the various operations. A suitable drive in the form of a motor 9 may be provided in the base 10 of the machine for driving the cams, which time the various operations.

Blank and finished button

Referring more particularly to Figs. 2, 2a and 2b, a blank 11 having a shank 12 is illustrated. Preferably the blank is formed from sea shells, by suitable cutting, slicing and grinding operations. While other types of blanks may be utilized without departing from the invention, the machine and method will be described with reference to the blank illustrated. As shown in Fig. 2a, a pair of side grooves 15 is milled in the shank 12 and the shoulders 13 of the button. The frazing or milling tools 16 shown in dot-dash lines illustrate a final position of the tools at the conclusion of the frazing operation. The tools are set to cut slightly into the shoulder of the blank, thus providing a guide for the hole to be drilled through the shank. This lateral aperture is formed by the drilling device described hereinafter.

The finished button, as shown in Fig. 2b, has side grooves 15 formed in the shoulder 13 and shank 12 of the button and a lateral aperture 14 drilled through the shank 12. The side grooves eliminate sharp edges which tend to fray the thread used for sewing the button in place. The fraze and drill hole are perfectly aligned. There are no steps or ridges to interfere with subsequent automatic sewing operations.

Blank feed

A preferred embodiment of the mechanism for feeding the blanks is illustrated more particularly in Figs. 1 and 3 and comprises a revolving shell 17, a ring 18 rotating with it, a stationary curved part 21 and a channel or guideway 2 attached to the hopper by a bracket 3. The guideway extends from the underside of the top of the revolving shell 17 to the selecting and positioning mechanism below. The ring 18, interchangeable for different sizes of blanks, is fastened by screws to the back of the revolving shell 17 and has a series of U-shaped recesses 19 in the inner periphery thereof. The under or open sides of these recesses 19 are closed by the outer rim 20 of the stationary curved part 21. The rim or flange 20 projects slightly above the bottom of the U-shaped recesses 18, except at the entrance to the guideway, so that the enlarged part of the button blank will rest against the rim, as shown in Fig. 3a, and hence be held in the recesses 19. If, however, the shank part of the blank is downward in the recess, the blank will tumble out of the recess down to the bottom of the receptacle with the rest of the blanks.

A supply of blanks is placed in the lower side of the hopper 1. As the shell 17 rotates, the recesses 19 pick up blanks. Where the shank is up, the blank is carried by the ring 18, being held by the rim 20 until the blank registers with the upper end of the guideway 2. At this point a suitable recess in the guideway 2 permits the blank to slide into the guideway. Preferably the left side of the guideway, shown in Fig. 1, is shorter than the right side so that when the guideway becomes filled with blanks the excess blanks may roll off and drop back into the receptacle. In this way by operating the hopper at a little greater rate than the frazing and drilling operations, the guideway will be filled at all times with blanks and the excess will spill over from the upper end of the guideway back into the receptacle 17. As pointed out above, where blanks are picked up by the recesses 19 with the shanks downward; that is, in inverted position, they drop out of the recesses because the rim 20 of the stationary part 21 is not sufficiently high to retain such blanks in the recesses 19. In this way only blanks in upright position; that is, as shown in Fig. 3 are delivered to the guideway 2. The hopper may be refilled while the machine is in operation. The blanks in the guideway 2 serve as a reserve supply permitting momentary stoppage of the hopper without stopping the machine. The recesses 19 are properly sized to reject oversize blanks.

Any suitable drive may be provided for the hopper. As illustrated in Fig. 1a, a hopper motor 26 of the gear ratio type is preferred. By the use of a reduction gear 25 the output driving spindle 27 operates in a horizontal position at right angles to the armature of the motor 26 and turns bevel gears 28 and 28a. Bevel gear 28 is coupled to friction plate 29 shown in Fig. 3. The revolving shell 17 is driven by the friction of plate 29 against plate 29a which is attached to the rear of the shell. In case of stoppage friction plate 29 slips until such stoppage has been removed, thus preventing breakage of parts. An alternative drive is depicted in Fig. 1.

As illustrated therein, a pulley (not shown) is keyed to a sleeve (not shown) for rotating the shell 17. The pulley may be driven by a suitable belt 25a attached to a corresponding pulley on the shaft of a motor 26, which is preferably mounted on a stationary part of the hopper, as shown in Fig. 1. Preferably provision is made to prevent breakage of parts if the hopper becomes jammed.

*Selecting, holding and releasing devices*

Referring more particularly to Figs. 4 to 6 illustrating preferred embodiments of devices for selecting a blank, holding it during the frazing and drilling operations, and thereafter releasing it, there is shown a base or frame 30 having an upstanding supporting member 31 secured to the lower end of the guideway 2. As the blanks fall by gravity down the guideway 2, the lowermost blank engages the upper end of a supporting and releasing member 32, as shown in Fig. 4. The releasing member 32 is pivoted at 34 with its lower end attached at 35 to the core 36 of a magnet 37. The opposite end of a rod connected with the core has secured to it a manipulating button 38. The release member 32 is normally held in its effective position for supporting the bottom blank in the guideway by means of a spring 39 attached to the magnet core 36 and to a bracket 40 on the frame. After a blank has been frazed and drilled, the magnet 37 operates to pull the core 36 to the right, which swings the upper end of the release member 32 to the left, permitting a button to drop down into a drawer or receptacle, not shown; there may be provided sufficient space between the member 32 and the adjacent cover plate to allow the button to drop straight down between these two parts into the receptacle. If it is desired to remove some or all of the blanks in the guideway 2, the button 38 on the core 36 of the magnet may be pulled in and out manually to release as many blanks as desired or to remove a defective blank. It is frequently necessary to empty the guideway at the end of the day, and the hand operation offers a convenient means of attaining this result. Dust or small particles resulting from the frazing and drilling may be drawn into a conduit through a screen, shown in Figs. 1 and 5, beneath the frazing tools, and preferably the interior of the tube is subjected to vacuum.

It is necessary that the blank be held accurately and firmly in position during the frazing and drilling operations. At the end of the guideway, or if desired at an interruption in the guideway just above the upper end of the release member 32, a pair of gripping members 41 (Fig. 5) is provided having cylindrical recesses at their ends 42 for gripping the periphery of the blank. The gripping members 41 are pivoted at 44 with their opposite ends secured together by a spring 45 tending to hold the gripping ends in open position.

The gripping members 41 are closed about a blank by means of a magnet or solenoid 47, the core of which is attached to a rod 48. The upper end of the rod 48 is operatively connected to a U-shaped wedge member 49 through the intermediation of a spring 50. When the magnet 47 pulls the rod 48 downwardly, the spring 50 forces the wedge member 49 downwardly, which in turn swings the pivoted gripping members 41 about their pivots to close the gripping ends 42 about a blank to hold it securely in position. The spring 50 will compensate for variations in blank diameters. After the frazing and drilling operations are completed, the rod 48 is raised by means of the magnet or solenoid 52 operatively connected to a pivoted lever 54 attached to the rod. The wedge member 49 rests against the block member 63, which is adjustably positioned on rod 48, and this block serves to lift the wedge member upon upward movement.

It is desirable that the hole drilled laterally in the shank be spaced at a uniform distance from the face of the underside of the blank. In some instances, the shanks vary in length and in thickness. In order to accomplish this, the present invention forces the button outwardly so that the flange is in firm engagement with suitable stops 55 during the frazing and drilling operations. A pusher rod 56 for engaging the top surface of the button is attached to a block 57 and held in its retracted position by a compression spring 58. The left side of the block 57 has an inclined surface 59 engaging an inclined surface 60 on a block 61 that extends around the vertically movable rod 48. The block 57 is forced to the right by the magnet 47 drawing the rod 48 downwardly, through the intermediation of the spring 62 which is forced downwardly by the adjustable member 63 fixed to the rod 48.

Thus, as the magnet 47 operates, the rod 48 is pulled downwardly, which resiliently forces the member 49 downwardly to swing the pivoted members 41 and close the gripping ends 42 about the blank. Simultaneously the spring 62 forces the member 61 downwardly against the cam surface 59 of the block 57 fixed to the pusher rod 56. The spring 62 cushions the operation to prevent breakage of the blanks. The spring also compensates for variations in size. The pusher rod forces the button outwardly into its outermost position to give maximum projection of the shank for the drilling operation and a uniform position of the hole with respect to the face of the blank. On the upward stroke of rod 48 an adjustably positioned block 63', which may be secured in position by a set screw or otherwise, moves the tapered block 61 upwardly.

When the release member 32 is swung from under a blank, the blanks above the bottom have to be supported or they would drop out of the guideway 2. For the purpose of supporting these blanks, there is provided a flexible supporting member 64 extending through a duct 64a in the frame and normally protruding into the channel of the guideway 2 so as to engage the top surface of the blank to be supported. The member 64 is attached to a slidable block member 65. A suitable slot 67 in the slidable member 65 permits it to extend over the rod 48 and at the same time to be slidable longitudinally. The left end of the block 65 engages a cam surface 68 on a vertical member 69 having its lower end secured to the core of a magnet 70. The member 69 is resiliently retained in its upper effective position by a compression spring 71. The magnet 70 is effective when energized to draw the member 69 downwardly and permit the spring 66 to disengage the holding member 64. When the magnet 70 is not energized the compression spring 71 overcomes the compression of the weaker spring 66 to hold supporting member 64 in its normal effective position.

Frazing mechanism

The mechanism for shaping the side grooves, called herein the frazing operation, is shown more particularly in Figs. 1 and 8. Referring to Fig. 1, a pair of frazing devices 5 and 6 are shown comprising motors 104 and 104a having frazing or milling tools 105 and 105a secured in suitable chucks 106 and 106a mounted on the ends of the motor shafts. Unlike the conventional frazing tools which are three-fluted and made of high-speed steel, frazing tools 105 and 105a are made of carbide and have a special six-fluted design which tends to cut down shock and provide more cutting surface. The motors 104 and 104a are mounted on brackets 107 and 107a. Since the two motors are similarly mounted, a description of one will be sufficient. The bracket 107 is suitably secured to the motor 104 by a bolt 108 or any other suitable means. The lower end of the bracket is secured on one side by a bolt 109 and on the other by a plate 110 held in position by a bolt 111.

The plate 110 engages the inner projections of both the brackets 107 and 107a to co-operate with the bolt 109 to hold bracket 107 in position and to co-operate with the bolt 109a to hold the bracket 107a in position. It will be noted that the brackets 107 and 107a are bolted to a base plate 112. The base plate 112 has an inverted V-shaped groove 115a on either side as have the frame members 115. The grooves 115a in members 112 and 115 combine to form a diamond-shaped channel 114. Preferably ball bearings are placed in the channel 114 to slidably mount the plate 112. A cover plate 125, secured to and movable with the slidable plate 112, minimizes entry of dust and dirt into the channel between the tray and the frame. The inverted V-shaped grooves on the opposite side are concealed by the lever 116. The slidably mounted base plate 112 carrying the frazing devices 5 and 6 may be moved inwardly so that the frazing tools 105 and 105a mill the shanks and shoulders of the buttons presented. This to-and-fro movement is accomplished by the lever 116 operatively connected to the base plate 112 by the link 117 at one end and by means of a cam roller 118 on the other end in engagement with a cam 119 shown in Fig. 7 mounted upon shaft 120 and driven by the motor 9 in the base of the machine through the intermediation of a reduction gear 121.

As the cam 119 rotates, the plate 112 and the frazing devices mounted upon it are moved into and out of frazing position so that a frazing operation is performed during each rotation of the cam 119. The frazing operation occupies approximately one-third and the drilling operation approximately two-thirds of the time required for a single cycle. Where the material of the blank is sufficiently hard that the drilling operation cannot be completed during this period, as will be described hereinafter, the inward movement of the frazing motors for the next cycle is prevented until the drilling operation has been completed.

In order to provide accurate adjustment of the frazing devices 5 and 6, to compensate for wear in regrinding the tools and the like, an eccentric adjustment is preferred. Such an adjustment is achieved by a bracket 122 secured to the slidable plate 112 having a bolt 124 in a slot thereof and by the eccentric cam 117a on the connecting link 117. The eccentric portions of the bolts 124 and 124a fit in suitable recesses in the brackets 107 and 107a. By loosening the bolts 109, 109a and 111 and rotating the bolts 124 and 124a, fine adjustments may be obtained. The bolts 109 and 109a may fit in suitable slots permitting such adjustment. The eccentric cam 117a allows a fine depth adjustment of the plate 112, and consequently of the entire frazing head with respect to link 117. Plate 112, the frazing carriage, may be pulled back for accessibility during tool changes, the link 117 swinging about pivot 117b. By uncoupling link 117, the frazing plate 112 may be withdrawn and the button may be drilled without preliminary frazing. Conversely, the frazing operation alone may be performed by cutting out the drill circuit panel switch 74p.

Drilling operation

Any suitable drive may be utilized for drilling the lateral aperture in the shank of the button but a special type of motor is preferred and is illustrated in Fig. 10 of the drawings. The motor is preferably a two-speed motor, the high speed being about 3600 R. P. M. and the low speed about 1100 R. P. M. A suitable attachment to the motor moves the drill forward until the hole is drilled, whereupon the high speed winding is automatically disconnected, the low speed becomes effective, and the drill is automatically withdrawn.

Referring more particularly to Fig. 10, there is shown a motor 74 having a fan 75 at one end for cooling purposes. The right side of the motor and the driving mechanism is broken away to give a horizontal section illustrating the parts of the drive and control mechanism. The drive shaft of the motor (not shown) has a gear (not shown) beneath and meshing with the gear 76, which in turn rotates the sleeve 77 and the parts thereon. A slidable collar 78 extends about and is keyed to a shaft 79 which extends outwardly to the drill chuck holder 80 and which is keyed to rotate with the sleeve 77. Normally a compression spring 81 intermediate a member 82 and the opposite end of the member 78 retains the member 78 in its extreme left position, as shown in Fig. 10. A series of weights of centrifugal elements 84 are mounted within the roof-shaped housing, one side of which is the left end of the collar 78 and the other side is a member 85. The weights 84 are cam-shaped to fit against the inclined walls of the member 85 and 78. When the drill is rotating at high speed, that is, 3600 R. P. M., these weights are thrown outwardly and force the collar 78 and shaft 79 to the right, which feeds the drill forward as the speed increases. Thus the drill automatically moves forward to drill the hole with the drill motor 74 on a stationary mounting. If the drill encounters a hard spot or a particularly hard shank, the rate at which the drill is fed forward is reduced, because of the increased resistance offered to the drill by the harder material. This resistance is transmitted back through the drill head to member 78 which opposes further movement to the right by centrifugal weights 84 until the additional resistance has been overcome. The drill motor 74 maintains a constant number of revolutions per minute, however. In this way the drilling rate is decreased when a hard material is encountered, giving ample time for the drilling operation even with the hardest of surfaces without damage to the drill. When the drill has reached the end of its stroke and completed the aperture through the shank, the collar 78 engages the end of a switch member or trip 74a'' operatively connected to a pivoted member 88. Raising the switch member 74a'' lowers the member 88 and permits the member 89 to move forward operating the electric switch 74a' which disconnects the high speed winding and connects the low speed winding of the motor. The reduced speed permits the weights 84 to move inwardly under the pressure of the spring 81 and the collar 78 retracts the drill shaft.

In the preferred embodiment a second switch member or trip 9a'' is also provided and attached to a pivoted member 92 which operates the electric switch 9a' through the intermediation of a member 95. This switch has an interlocking operation which will be described in more detail later and which prevents the frazing operation of the next cycle unless the drill is in its retracted position. In this way simultaneous operation of both the drill and frazing mechanism is prevented, and damage resulting from interference between the two is avoided.

In view of the severe wear on the drill, an extremely hard material, which is usually brittle, should be used in making the drill. A carbide drill has been found to give best results. Preferably the drill proper is a two-flute design. The material in a carbide drill is brittle and tends to break under severe strains and jars. The present invention eliminates the disadvantages encountered with such drills and at the same time retains the advantages which such types of drills have in this type of work.

This is accomplished by the mechanism shown more particularly in Fig. 11. The carbide drill 96 is not mounted in the usual drive chuck but is mounted in a holder which absorbs shocks and side motion in the drilling operation. The preferred embodiment provides a sleeve portion 97 with a chuck 98 at one end and a second chuck 99 at the other. Suitable threaded sleeves 100 and 101 may be operated to open and close the chucks. The drill 96 is mounted in one chuck and a spring steel rod or wire 102 is mounted in the other chuck and in the chuck 80 of the motor drive. The spring steel rod or wire permits side sways which would break the drill 96 and at the same time absorbs shocks which would also break or damage the drill. In this way the advantages of a hard, brittle carbide drill are attained without the resulting disadvantages. Without the present attachment such a drill could not be used. With the present attachment the drill may be used up to eight hours without regrinding.

*Wiring diagram*

In the following description of the wiring diagram and the electric circuits, it will be helpful to keep in mind that each of the circuits is controllable by a hand-operated switch on the panel board so that the particular element may be cut out manually. Of course, it has to be cut back in manually for the automatic switching operations to be effective. The hand-operated switches permit each circuit to be cut out for testing purposes and the like. In addition to the manual switches controlling the respective circuits, there are one or more automatic switches, four of which are operated by cams 119a and 119c shown in Fig. 8, two of which are operated by cam 119 of Fig. 8 through the intermediation of the lever 116, and two of which are operated by the drill motor illustrated in Fig. 10, one at the end of the forward stroke of the drill and the other at the end of the return stroke of the drill.

Likewise for simplicity the suffix "a" is used for automatic switches and the suffix "p" for panel or manual switches. Generally the wiring connections for each of the elements is designated by the number of the element with a letter as a suffix.

In Fig. 9 a three-phase electric circuit is shown with the lines L1, L2 and L3 connected through a three pole switch 127 to a suitable source of power. The three contacts 132b, 132c and 132d are controlled by the devices shown within the broken lines 145. The machine is put into operation; that is, the contacts 132b, 132c and 132d are closed, by momentary depression of the start button 131 shown in Fig. 1. Referring to Fig. 9, it will be noted that the closing of switch 131p energizes holding coil 137, one side of which is connected to the power line L1 by lead 137b and the other side of which is connected to power line L2 by lead 137c, lead 137d, switch 131p, lead 137h, lead 137j and contact bar 135. Contact bar 135 is held normally closed across contacts 139 by spring pressure. It opens contacts 139 and closes contacts 140 only when holding coil 138 is energized. The momentary depression of switch 131p also closes contact 137e, together with the main power line contacts 132b, 132c and 132d, as already mentioned. Upon the release of the start button 131, switch 131p opens. Holding coil 137 is still connected to the power line L1 by lead 137b but it is now connected to the power line L2 by lead 137c, lead 137f, closed contact 137e, lead 137j and contact bar 135. The various motors and magnets may now be operated from the power lines L1, L2 and L3 as will be described below.

Referring to Fig. 4, it will be noted that the magnet 47 is operated to draw the rod 48 downwardly, thereby to operate the closing chuck or gripper which positions the blanks for the frazing and drilling operation. The circuit for this magnet 47 is shown in Fig. 9. One side of the magnet is connected by the lead 47b to the power line L2 and the other side is connected to power line L1 through the intermediation of lead 47c, automatic switch 47a and panel switch 47p. The automatic switch 47a controls magnets 47 and 52; as shown in Fig. 8, it is operated by the lever 116. The switch 47a normally energizes magnet 47, during which its contact is not contacted by the layer 116; as cam roller 118 moves into an appropriate cam recess 119' (provided partially in each of the cam portions 119 and 119b), the switch 47a is operated by the cam lever 116, the magnet 47 is de-energized, the magnet 52 is energized, and the blank-holding jaws and backing pin are actuated to release the blank, as lever roller 118 moves out of recess 119', upon continued rotation of the cam assemblage, the lever 116 is moved in an opposite direction about its pivot and the magnet 47 again energized and the magnet 52 de-energized.

The magnet 52, shown in Fig. 4, which raises the rod 48 for unclamping a finished button, is connected to the power line L2 by the lead 52b and to the switch 47a by the lead 52c, which connects with contact 52a on one side of the switch 47a. As described above, the switch 47a is connected to the power line L1 by lead 47c and panel switch 47p.

The magnet 70, shown in Fig. 4, for operating the selector or member 64 which supports the button blanks in the guideway 2 when the bottom blank is released, is connected to the power line L2 by the lead 70b and to power line L1 by the lead 70c, automatic switch 70a and the hand-operated panel switch 70p. The automatic switch is shown in Fig. 8 and controlled by the rotating cam 119a so that the circuit is closed to hold the rod 69 in its downward position when it is desired to release a button for retention by the release member 32 and in position to be gripped for frazing and drilling. At other times the spring 71 retains the member 64 in effective position.

The magnet 37, as shown in Fig. 4, swings the release member 32 about its pivot to release a finished button. The circuit for the magnet 37 is shown in Fig. 9 where the lead 37b connects it with the power line L2. The other side of the magnet is connected with power line L1 through the intermediation of lead 37c, automatic switch 37a and panel switch 37p. The automatic switch 37a, as shown in Fig. 8, is operated by the cam 119c to release finished buttons.

The frazing motors 5 and 6 operate continuously at a relatively high speed—18,000 R. P. M. in the preferred embodiment. The electric connections for these motors are also shown in Fig. 9. One side of the frazing motor 5 is connected through the lead 5b to the power line L2 and the other side of the motor is connected through the lead 5c and panel switch 5p to the power line L1. Frazing motor 6 is connected to the power line L2 by the lead 6b and to the power line L1 by the lead 5c and the panel switch 5p. These motors are controlled by the automatic start-stop relay circuit described herein and by the panel switch 5p.

The hopper motor 26 (Figs. 1 and 9) is connected to the power line L2 by lead 26b and to the power line L1 by lead 26c, overload control 26d and panel switch 26p. The hopper motor is also controlled by the automatic start-stop relay circuit described herein. Preferably the hopper motor is connected to the hopper through reduction gears and friction plates.

As explained hereinbefore, the drill motor 74 has a high speed winding which operates at about 3600 R. P. M., and a low speed winding which operates at about 1100 R. P. M. The drill is automatically moved forward on its feed stroke when the high speed winding is energized and automatically returned from its stroke when the current is disconnected from the high speed winding and connected to the low speed winding. The controls for these high and low speed windings are shown in the wiring diagram of Fig. 9. The panel switch 74p controls both the high speed and the low speed winding. The power line L2 is connected to this switch by the lead 74c. The other side of the switch connects through the control for the low speed winding through the automatic switch 74a operated by the cam actuated lever 116, shown in Fig. 8, a normally closed contact 74d and a low speed holding coil 74e. When the machine is started by depression of the start button 131, current flows through the main power lines L1, L2 and L3. Switch 74a is normally closed as shown in Fig. 9. As low speed holding coil 74e is energized it closes simultaneously the low speed winding contacts 74L, 74M, and 74N. At the end of the frazing operation, when the highest point on cam 119 is reached, cam-actuated lever 116 operates switch 74a. The normally closed side of the switch is momentarily opened and the normally open side momentarily closed, energizing the high speed holding coil 74e'. Once energized, high speed holding coil 74e' operates simultaneously five contacts, closing normally open contact 74g and high speed winding contacts 74h, 74j and 74k, and opening the normally closed contact 74d. Thus the high speed winding circuit is closed and the low speed winding circuit opened. As cam roller 112 rides down from the high point of cam 119 to the surface of cam 119b, switch 74a is restored to its normal position, as shown in Fig. 9 breaking circuit 74f. The high speed holding coil 74e' remains energized, however, through the high speed drilling circuit 74f'. As pointed out hereinbefore, the material of some of the blanks is sufficiently hard that often it is not possible to drill the shank within the time limit of the usual cycle without undue strains and wear on the drill. To prevent this undesirable wear and strain on the drill, the high speed drilling circuit 74f, is provided, leading through switch 74a' and the normally open contact coil 74g, which is in parallel with the high speed circuit 74f and switch 74a. The automatic switch 74a' is shown in the drill motor drive in Fig. 10. The high speed winding is not disconnected nor is the low speed winding connected, until switch 74a' is opened. When the drill has reached the forward end of its stroke, the collar 78 engages the end of a switch member or trip 74a'', operatively connected to switch 74a', so that the switch 74a' is opened. This breaks the high speed drilling circuit 74f' and deenergizes high speed holding coil 74e'. As a result the five switches actuated by said coil return to their normal positions as shown in Fig. 9; high speed winding contacts 74h, 74j and 74k open, as does the normally open contact 74g, while the normally closed contact 74d closes, energizing the low speed winding circuit. Hence unless the drill has reached the end of its stroke and completed its drilling operation, the automatic switch 74a' will be closed and the high speed will continue with the low speed circuit winding open. Heater coils 74t and 74t' protect the high speed drill winding by opening the normally closed contact 74f, thus breaking the high speed circuit, if the motor becomes overloaded.

Thus it will be seen that the drill motor never stops so long as power is supplied to the machine; it merely is switched from low idling speed to high drilling speed periodically. Where excessive hardness is encountered in the button shank the automatic switch 74a' in the drill head continues the drilling operation until the drill reaches the end of its stroke.

The motor 9 for driving the cams which operate the several automatic switches for controlling the solenoids and other electrical circuits is connected to the power line L2 by the lead 9b and to the other power line L2 through the lead 9c, the overload control 9f, panel switch 9p and relay 9e. In other words, the motor 9 will not operate unless the relay 9e is energized to hold the contact bar 9e' closed.

The relay 9e is connected to the power line L1 on one side by the leads 9g and 9c. On the other side the relay 9e is connected to the power line L2 by the leads 9d' and 9d'' which are in parallel. The lead 9d' is controlled by the switch 9a, operated by the cam 119a, as shown in Fig. 8. The other parallel line 9d'' is controlled by the switch 9a' inside the drill unit (see Fig. 10). In other words, the cam motor 9 will operate if either of the automatic switches 9a or 9a' is closed. The switch 9a is operated by the cam 119a and is opened by the cam once during each revolution thereof. If the switch 9a' is open at that time, the cam motor stops, and of course the cycle is stopped. The switch 9a' in the motor unit is operated by the motor at the conclusion of its drilling operation; in other words, when the low speed motor winding becomes effective and the speed of the motor drops to about 1100 R. P. M., the drill is retracted and the switch 9a' is operated to close the circuit through the relay 9e. Thus the cam 9 continues to rotate unless the switches 9a and 9a' are both open. This only occurs if the motor is operating at high speed at the time the switch 9a is opened by the cam 119a. In that case the cam stops its rotation until the drilling operation is completed and the drill is retracted. In this way the frazing operation and the operations of the solenoids are discontinued until the drilling operation is finished. The cycles will continue consecutively unless a blank is encountered requiring an unusually long time to drill, in which case the cam stops as described above until the drilling operation is completed.

To stop the machine, button 133 is depressed momentarily. Referring to Fig. 9, it will be seen that the closing of switch 133p energizes holding coil 138, one side of which is connected to power line L1 by lead 138b and the other side of which is connected to power line L2 by lead 138c, lead 138d, switch 133p, lead 138f, the closed switch 131p and the switch 133a which is actuated by cam 119a. Contact bar 135 moves to position 135', across contacts 140. Upon the release of the stop button 133, switch 133p opens. Holding coil 138 is still connected to the power line L1 by lead 138b, but it is now connected to the power line L2 by lead 138c, lead 138e, contact bar 135, lead 138f, closed switch 131p and cam-actuated switch 133a. The circuit energized by holding coil 137 during the operation of the machine has thus been broken by the movement of contact bar 135, but the machine continues to operate through the auxiliary circuit just described which passes through cam-actuated stop switch 133a and acts as a time delay circuit. At the end of a cycle of operations cam 119a opens switch 133a, interrupting the time delay circuit, and main power line contacts 132b, 132c and 132d are restored to their original open positions. This cuts off power from all circuits and the machine stops.

Thus, when the stop switch is operated the machine continues to run until a cycle is completed. This resets the machine for the beginning of the next cycle regardless of the position at which the stop button was actuated. A safety cutout switch 134 is provided for emergency stops.

*Operation*

In the operation of the machine, suitable blanks are placed in the hopper 1 (Fig. 1). These blanks are picked up by the recess 19 in the rotating plate 18. If the blanks are in upright position, the circular shoulder or rim 20 holds them in the recesses until they reach the guideway 2, where they slide into the guideway. The inverted blanks, however, will roll over the shoulder or rim 20 and drop back into the bottom of the hopper. The feed of the blanks is slightly in excess of that needed by the machine, the excess blanks spilling over the left side of the upper end of the guideway 2.

A series of blanks fill the guideway 2 with the lowermost one resting on the release member 32 (Figs. 4 and 5). At this point the bottom blank has to be held in position for the frazing and drilling operation. This is achieved by the gripping members 41 pivoted at 44 and operated by the magnet 47 through the intermediation of the rod 48 and spring 50 effective upon the cam member 49 (Fig. 6). Simultaneously the spring member 62 also on the rod 48 forces downwardly the wedge or cam member 61 to force the rod 56 against the button in opposition to spring 58. Thus the gripping members center the button and hold it in position while simultaneously the rod 56 pushes the button outwardly so that the shank projects a maximum amount in each case. When the button is thus clamped firmly in position, the cam 119 through the intermediation of the cam roller 118 swings the lever 116 about its pivot to force the frazing motors into frazing position; the frazing motors run continuously. After the frazing operation is completed, the frazing motors are returned by the chain 128 passing over a pulley 129 with a suitable spring or weight on its free end. As the cam actuated lever 116 retracts the frazing motors 5 and 6, it closes the switch 74a to disconnect the lower speed winding and to connect the high speed winding of the drill motor 74. The weights 84 of the drill unit (Fig. 10) are thrown outwardly by centrifugal force, forcing the collar 78 and the drill shaft within it to move to the right, compressing spring 81. If the drill encounters a particularly hard shank, the rate of drilling will be reduced by the increased resistance of the harder material which is transmitted back to the side of the centrifugal weight housing, slowing the rate of feed. In this way, a longer period of drilling is allowed for hard material and severe strains on the drill are avoided. At the end of the drilling stroke, the collar 78 operates the electric switch 74a' which disconnects the high speed winding and connects the low speed winding of the motor. The motor then runs at low speed until the lever 116 again operates the switch 74a to connect the high speed winding of the drill motor 74. With the drilling operation completed, the cam 119c closes the switch 37a to operate the solenoid 37 (Fig. 4) which swings the release member 32 about its pivot 34 to release the finished button which falls down into a suitable receptacle (not shown).

After the release member is returned to its position, the cam 119a closes the switch 70a to energize the magnet 70 which draws downwardly the cam member 69 and permits the slide 65 to move toward the left under the influence of spring 66. This moves the member 64 to the left so that the blanks in the guideway 2 may drop until the lowermost one is stopped by the release member 32. Thereafter the cam 119a opens the circuit through the magnet 70 and permits the spring 71 and the members 69 and 65 to press the member 64 against the blank next to the bottom one in order to hold them in position when another button is released. The cycle as thus described continues without interruption unless the drilling time required exceeds that of the cycle determined by the speed of the cam motor 9. In that case the cam motor is stopped by the opening of the switches 9a controlled by the cam 109a and 9a' in the motor head simultaneously.

The circuits for operating the switches have been described in detail under the heading of "Wiring Diagram." The inclusion of these at this point would be repetitious as reference may be had to the wiring diagram for the operation of each circuit. As pointed out previously, once the start button has been depressed the operation of the several circuits is entirely automatic, although any one of the circuits may be cut out by a hand-operated switch on the panel. These switches are designed with the suffix "p" indicating "panel switch." Automatic switches are generally given the suffix "a" after the number of the parts which they control.

It will be seen that the present invention provides an improved construction which automatically frazes grooves or channels in the shoulders and shanks of button blanks and, with these grooves as guides, automatically drills apertures in the shanks thereof. The operations are entirely automatic. A system of cycle control insures a uniform sequence of operations, the machine is started by pressing a single button and stopped in the same manner. However, the machine comes to a halt only after it has completed drilling the final button. The operator is required only to watch the machine and to keep the hopper supplied with blanks. One operator may care for several machines, and the cost of manufacturing buttons is greatly reduced. In addition, the compensating devices which permit slow drilling with hard blanks minimize wear on the drill, which is a substantial item. Likewise the improved connection of the drill to its chuck through the intermediation of a spring rod permits side sway and absorbs shocks, which further reduces the wear on the drill. The machine is compact, self-contained and may be moved around from one position to another. The various elements are motor-operated. The parts of the machine are sturdy and fully capable of withstanding the rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of frazing and drilling the shanks of button blanks and the like which comprises, feeding the blanks consecutively along a generally upright path, positioning the lowermost of said blanks against movement in any direction, frazing the shank of said lowermost blank, drilling the shank in said lowermost blank, all in consecutive operations, and automatically controlling the speed of drilling responsively to the hardness of the shank to avoid breaking the drill.

2. The method of frazing and drilling shanks of buttons which comprises, feeding the blanks consecutively to a guideway and therealong in edgewise manner, positioning the blanks in the guideway so that the shank of each blank projects outwardly a uniform distance, thereafter frazing the shoulders and shanks thus positioned to provide side channels therein, drilling an aperture transversely of the shank while the blank is so positioned, and automatically controlling the speed of drilling responsively to the hardness of the shank to avoid breaking the drill.

3. The method of frazing and drilling the shanks of buttons which comprises, feeding the blanks in a continuous row and positioning the blanks consecutively with the shanks exposed, frazing channels in the shoulders and shanks of said blanks, drilling lateral apertures in the shanks, automatically controlling the speed of drilling responsively to the hardness of the shank to avoid breaking the drill, and preventing the operation of said drilling until after the completion of the frazing operation.

4. In a device of the class described, the combination of a holder for a button having a shank thereon, a drill, means for driving the drill to drill an aperture through the shank of said button, and means for attaching a flexible rod between said means and said drill to absorb shocks and side motions which may be applied to the drill.

5. In a device of the class described, the combination of a guideway adapted to contain a series of button blanks, means for releasably supporting the bottom button in the guideway, means for positioning said bottom button in the guideway, means for supporting the buttons above said bottom button in the guideway, and electromagnetic means for operating said positioning and supporting means.

6. In a device of the class described, the combination of a guideway adapted to contain a series of button blanks, means for releasably supporting the bottom button in the guideway, means for positioning said bottom button in the guideway, means for supporting the buttons above said bottom button in the guideway, electromagnetic means for operating said positioning and supporting means, and cam means for operating said electromagnetic means consecutively.

7. In a device of the class described, the combination of a generally upright guideway, rotating means movable past an upper portion of said guideway for picking up button blanks having a shank thereon and delivering them to said guideway, and stationary means extending along a portion of said rotating means for retaining the blanks in said pickup means, said retaining means being ineffective on blanks having their shanks in inverted position.

8. In a device of the class described, the combination of a guideway, rotating means for picking up button blanks having a shank thereon and delivering them to said guideway, means extending along a portion of said rotating means for retaining the blanks in said pickup means, said retaining means being ineffective on blanks having their shanks in inverted position, one side of said guideway at its upper end being open to permit the blanks to pass over the guideway when the guideway is filled with blanks.

9. In a device for frazing and drilling buttons having shanks thereon, the combination of means for positioning a blank having a shank thereon, frazing means for forming channels in the sides of the shank, means for drilling an aperture through said shank, a cam for moving the frazing means inwardly and outwardly to effect its operations, and centrifugal means for controlling the inward and outward motion of the drilling means.

10. In a device for drilling apertures in buttons, the combination of a drill for drilling an aperture in a button blank, centrifugal means for controlling the rate of drilling, and means responsive to the position of the drill for preventing subsequent operations on the button until the drilling is completed.

11. In a device for frazing and drilling shank button blanks, the combination of frazing means for forming channels in the shank, a drill for drilling an aperture in the shank, centrifugal means for controlling the rate of drilling, and means responsive to the position of the frazing means for preventing the drilling until the frazing operation is completed.

12. In a frazing and drilling device, the combination of a drill for drilling an aperture in a blank, centrifugal means for regulating the drilling responsive to the hardness of the material, and means for delaying other operations if the drilling is not completed in a predetermined period.

13. In a device for drilling button blanks, devices for positioning said blanks for the drilling operation, devices for releasing said blanks after they are drilled, electromagnets for operating said devices, a drill for drilling an aperture in the blank, and a timing cam for timing the operation of said electromagnets and the normal starting and stopping of the drill.

14. In a device for frazing and drilling the shanks of buttons, the combination of devices for positioning the blanks for the frazing and drilling operations, devices for releasing said blanks after they are frazed and drilled, electromagnets for operating said devices, frazing devices for forming channels in the shank, a drill for drilling an aperture in the shank and means including a cam for timing the operation of said electromagnets, said frazing devices and said drill.

15. In a device of the class described, the combination of a guideway adapted to receive button blanks having shanks thereon with the shanks projecting therefrom, a pivotally mounted member having a portion projecting within the guideway for supporting a bottom button blank in the guideway, means above said member for positioning said bottom button blank in the guideway with maximum projection of the shank, means for frazing channels along the sides of the shank, means for drilling an aperture through the shank of said blank, and electromagnetic means for moving said positioning means away from the blank and said member out of supporting relationship with the blank thereby to release the blank.

16. In a device of the class described, the combination of a pair of pivotally mounted members for engaging and centering a button blank having a shank thereon, electromagnetic means for forcing said button outwardly of said members so that the shank will be exposed a uniform amount, and means for shaping the shank of said button while so engaged and centered and while said force is applied.

References Cited in the file of this patent
UNITED STATES PATENTS

| Number | Name | Date |
|---|---|---|
| 323,312 | Otis | July 14, 1885 |
| 693,565 | Pendry | Feb. 18, 1902 |
| 974,532 | Skipp | Nov. 1, 1910 |
| 1,020,359 | Lane | Mar. 12, 1912 |
| 1,089,856 | Morrissey | Mar. 10, 1914 |
| 1,241,467 | Hastings | Sept. 25, 1917 |
| 1,353,680 | Vesely et al. | Sept. 21, 1920 |
| 1,863,737 | Witte | June 21, 1932 |
| 2,029,255 | Conner | Jan. 28, 1936 |
| 2,313,981 | Weber et al. | Mar. 16, 1943 |
| 2,333,121 | Pfeiffer | Nov. 2, 1943 |